UNITED STATES PATENT OFFICE.

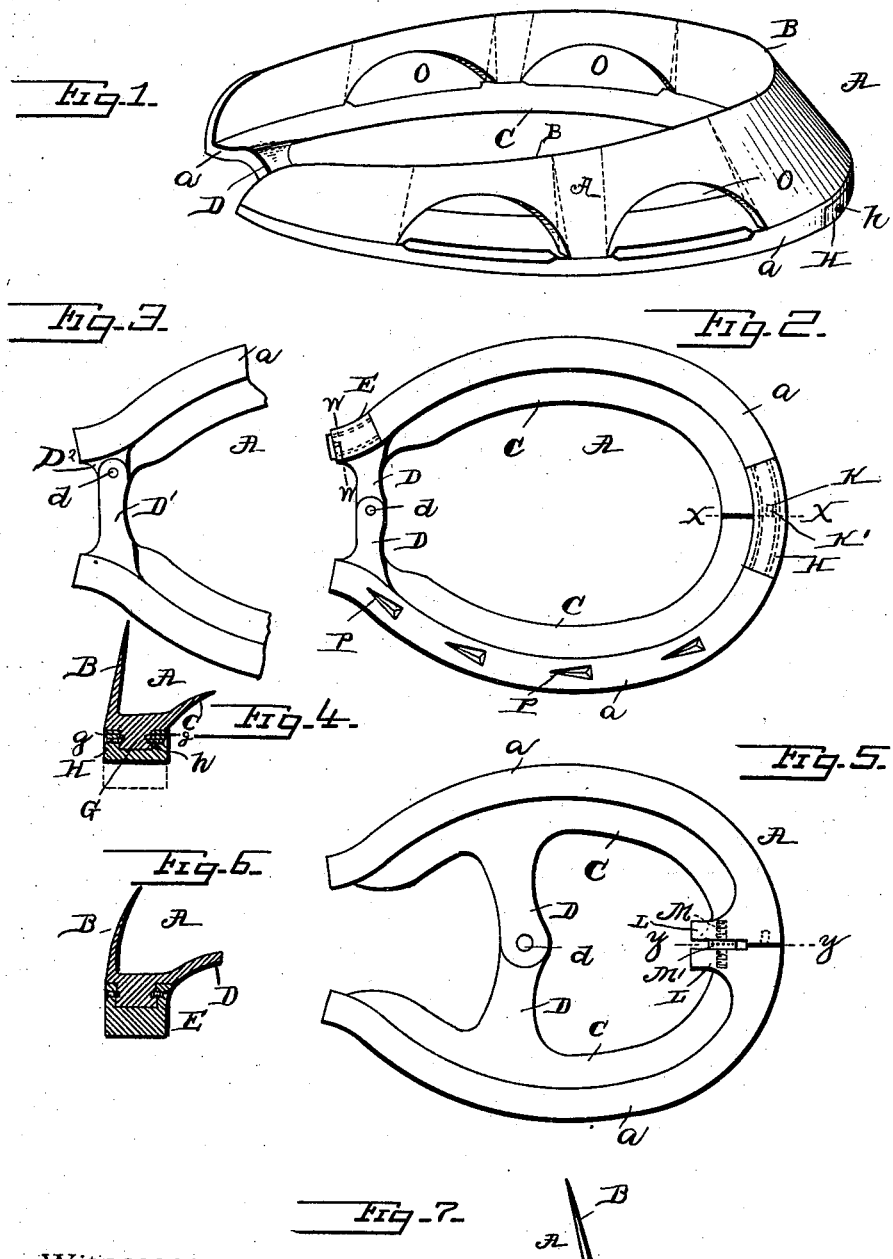

HARRY D. SHAIFFER, OF PHILADELPHIA, PENNSYLVANIA, ASSIGNOR OF ONE-SIXTH TO HENRY B. HANFORD, OF SAME PLACE.

NAILLESS HORSESHOE.

SPECIFICATION forming part of Letters Patent No. 591,373, dated October 5, 1897.

Application filed August 7, 1895. Serial No. 558,530. (No model.)

*To all whom it may concern:*

Be it known that I, HARRY D. SHAIFFER, a citizen of the United States, residing at Philadelphia, county of Philadelphia, and State of Pennsylvania, have invented a new and useful Improvement in Horseshoes, of which the following is a full, clear, and exact description, reference being had to the accompanying drawings, which form a part of this specification.

My invention relates to horseshoes generally, but particularly to those which are secured to the hoof without the use of nails; and it consists in certain improvements in details of construction hereinafter fully described, and pointed out in the claims. These improvements are particularly designed to be applied to the type of nailless horseshoes set forth in my application filed March 5, 1895, Serial No. 540,656.

The objects of my invention are to shape the shoe so that the frog of the hoof will rest below the level of the under surface of the shoe and strike the ground when walking or running; to lighten the weight of the shoe by cutting away portions of the same; to provide the shoe with removable calks; to prevent slipping of the shoe upon the ground, and to afford an improved means for locking the two halves of the shoe in order to obviate the possibility of loosening or displacement.

In the drawings, Figure 1 is a perspective view of my improved shoe; Fig. 2, an inverted plan showing preferred form of locking device, preferred form of pivotal connection between the two halves of the shoe, and detachable heel-calks. Fig. 3 is a view similar to Fig. 2 of the rear portion of the shoe, showing a modified form of pivotal connection; Fig. 4, a section on the line $x\ x$, Fig. 2; Fig. 5, a view similar to Fig. 2, showing modified form of locking device and another modified form of pivotal connection between the two halves of the shoe; Fig. 6, a section on the line $w\ w$, Fig. 2; and Fig. 7, a section on the line $y\ y$, Fig. 5.

A A designate the two parts or halves; $a$, the base of the shoe, which is of suitable shape and size to fit the hoof. Each of the parts or halves A is provided with an upwardly and inwardly extending flange B, arranged so as to rest against the outer surface of the hoof, and a flange C, extending inwardly and somewhat upwardly from the inner edge of each of the parts or halves A, said flange being suitably shaped to fit the concave under surface of the margin of the hoof. Extensions D are provided, preferably, upon the flanges C, which extensions are prolonged inwardly and are pivoted together at $d$.

The general construction just described is that set forth in my application hereinbefore referred to, and I shall now proceed to describe the particular improvements which form the subject of my present invention.

In the first place, the extensions D instead of branching off from the rear ends of the flanges C in a forward and inward direction are arranged so as to branch off from the rear ends of the shoe inwardly, but not forwardly, as shown in Fig. 2. This construction is adopted for two reasons: first, so that the pivot $d$ of the extensions will not lie directly beneath the frog of the hoof in order that the frog may have an open space beneath it, for reasons which will appear hereinafter; secondly, in order that the shoe when applied to the hoof (which is done by placing the shoe upon the hoof in an open position and then swinging the parts A upon their pivotal connection and bringing the forward ends together) will bind inwardly throughout its entire length and compress the shoe firmly at all points, making a neat and absolutely tight fit, whereas if the pivotal connection be moved forward in clamping the shoe upon the hoof the rear ends of the shoe will fit against the rear sides and back of the hoof flush.

In Fig. 5 the pivotal connection $d$ instead of being located at the rear of the shoe is moved forward, so as to lie near the center of the shoe and in such position as to lie forward of the frog when the shoe is in position on the hoof. The construction of Fig. 2 I prefer to use for large and heavy shoes on heavy draft-horses, while the construction of Fig. 5 I prefer to use on running, trotting, and driving horses, as it allows the frog to expand more fully. In the next place, the base $a$ of the shoe is tapered, as seen in Fig. 1, so that the thickest part of the shoe is at the front, while the thinnest part is at the extreme rear, the base $a$ gradually increasing in thickness from the extreme rear end to the extreme front of the shoe. I construct the shoe in this manner for the reason that the rear part of the hoof having but a comparatively thin surface to rest upon the frog of the hoof will extend beneath the plane of the under surface of the shoe and make contact with the ground by reason of the open space beneath it, as described in the preceding paragraph. I have observed that when a horse is running, trotting, or pacing the frog, being tough and elastic, acts as a cushion or spring, and a horseshoe provided with calks or of such thickness that the frog does not make contact with the ground prevents the frog from performing its natural function as an aid to speed and lightness and ease of travel. In case, however, it is found desirable for any reason to have the usual calks upon the shoe I have provided detachable heel-calks E. (Shown in one-half of the inverted plan in Fig. 2 and in transverse section in Fig. 6.) The base $a$ is cut away, as shown, and the calk E is dovetailed, as shown, so that it can be slipped and fitted upon the base. Lengthwise displacement of the calk is prevented by screwing or bolting it on both sides to the base or securing it in any other convenient manner. The toe-calk and method of securing it will be particularly described hereinafter.

My improved locking device for securing together the front ends of the two halves A A, as shown in Fig. 2, is constructed as follows: An inset is cut into the under surface of the front end of each of the halves, forming a projection G, each side of which is slightly tapered off toward the top, as illustrated in Fig. 6. A dovetail clamp H, adapted to slide and fit upon the projections and of substantially twice the length of each projection, is provided with screw or bolt holes $h$, which are adapted to aline with two transverse screw or bolt holes $g\ g$, one in each projection. Locking screws or bolts have a screw-threaded engagement with said clamp H and projections G, whereby the forward ends of the parts A of the shoe are held or locked together. The base of clamp H is of substantially the thickness of the depth of the inset beneath the projections, so that when the two parts are fitted together the entire bottom of the shoe will present an unbroken level surface. If, however, it is desired to use a toe-calk, the thickness of the base of clamp H may be increased to the requisite extent, as shown in dotted lines, Fig. 4, forming a combined locking device and toe-calk. In order to insure the proper engagement of the forward ends of the halves A, I may provide one of the projections with an end orifice K and the other projection with an end pin K', adapted to fit into said orifice.

A modified construction of locking device is shown in Figs. 5 and 7, wherein apertured lugs L extend rearwardly from the forward ends of the parts A. A right-and-left screw or bolt M, having the nut M', engages the apertures in the lugs L. By turning the nut the forward ends of the shoe are brought together.

In order to lighten the shoe, the flanges B are cut away from the base $a$ upwardly, forming semicircular orifices O. This in no way weakens the shoe, while the cutting away of so large a weight of metal materially lightens it. The flanges may be cut away from top to bottom at different points throughout their length, as shown in dotted lines, Fig. 1, or the orifices may be shaped in any desired manner.

By reference to one-half of Fig. 2 it will be seen that recesses P, deepest at their forward ends and sloping gradually backward to the surface, are sunk in the bottom of the base $a$. Dirt or pebbles will be pressed into them at every engagement of the shoe with the ground, which enables the shoe to get a firmer grip and prevents slipping, while the sloping roofs of the recesses facilitate dislodgment of the dirt particles when the hoof is raised. Also the contact of the shoe with the ground creates a suction of air that materially assists the shoe in maintaining its hold upon the ground. These recesses may be aptly termed "suctional calks."

In Fig. 3 instead of the extensions D being of equal length, so that the pivot $d$ lies midway between the flanges C, I have shown a long extension D', pivoted to a short extension $D^2$, so that the pivot-point will lie close to one of the halves A, which somewhat strengthens the pivotal connection without affecting the capacity of the shoe for ready adjustment.

Shoes having the main features of construction that I have described may be made of rubber, aluminium, or fiber instead of the malleable iron or steel suitable for ordinary use, and when so made are excellently adapted for use as "creepers" or ice-shoes. The rubber is preferably corrugated on the under surface of the shoe, so as to present a rough surface to the ground.

Having now fully described my invention, what I claim, and desire to protect by Letters Patent, is—

1. A horseshoe comprising a plurality of parts or halves pivotally connected together and having an inset formed in the under surface of the front end of each of the halves, the said front ends being cut away at the sides and forming projections, in combination with a clamp adapted to fit over said projections and having orifices in alinement with the orifices in the projections, when the said clamp is in place upon the shoe, substantially as described.

2. A horseshoe comprising a plurality of parts or halves connected together and having insets formed in the under surface of the opposite front ends of the parts, the said front ends being also cut away at the sides and forming downward projections, in combination with a clamp adapted to fit over said projections, and having a base of greater thickness than the depth of the inset so as to form a toe-calk.

3. A horseshoe comprising a plurality of parts or halves pivotally connected together, and having an inset formed in the under surface of the front end of each of the halves, the said front ends being cut away at the sides and forming projections, in combination with a clamp adapted to fit over said projections, and means for detachably securing said clamp to said projections, substantially as described.

In testimony of which invention I have hereunto set my hand.

HARRY D. SHAIFFER.

Witnesses:
FRANK S. BUSSER,
WM. C. BUSSER.